US006874129B2

(12) United States Patent  (10) Patent No.: US 6,874,129 B2
Smith  (45) Date of Patent: *Mar. 29, 2005

(54) MUTATABLY TRANSPARENT DISPLAYS

(75) Inventor: Kim C. Smith, Colleyville, TX (US)

(73) Assignee: Gateway, Inc., Irvine, CA (US)

( * ) Notice: Subject to any disclaimer, the term of this patent is extended or adjusted under 35 U.S.C. 154(b) by 682 days.

This patent is subject to a terminal disclaimer.

(21) Appl. No.: 09/818,140

(22) Filed: Mar. 27, 2001

(65) Prior Publication Data

US 2001/0012022 A1 Aug. 9, 2001

Related U.S. Application Data

(63) Continuation of application No. 09/209,017, filed on Dec. 10, 1998, now Pat. No. 6,222,531, which is a continuation of application No. 09/002,986, filed on Jan. 5, 1998, now Pat. No. 5,933,141.

(51) Int. Cl.[7] .............................................. G06F 15/00
(52) U.S. Cl. ........................................ 715/803; 715/721
(58) Field of Search .................................. 345/716, 763, 345/765, 853, 854, 762; 725/4, 5, 10; 713/803, 723

(56) References Cited

U.S. PATENT DOCUMENTS

| | | | |
|---|---|---|---|
| 4,823,283 A | 4/1989 | Diehm et al. | |
| 5,283,560 A | 2/1994 | Bartlett | |
| 5,437,044 A | 7/1995 | Hohner et al. | |
| 5,544,297 A | 8/1996 | Milne et al. | |
| 5,598,522 A | 1/1997 | Inatomi | |
| 5,625,783 A | 4/1997 | Ezekiel et al. | |
| 5,850,218 A | * 12/1998 | LaJoie et al. | 345/716 |
| 5,933,141 A | 8/1999 | Smith | |
| 5,987,509 A | * 11/1999 | Portuesi | 709/217 |

FOREIGN PATENT DOCUMENTS

| | | |
|---|---|---|
| EP | 0605945 | 7/1994 |
| EP | 0677803 | 10/1995 |
| WO | WO97/17650 | 5/1997 |

OTHER PUBLICATIONS

"Visually Aging Icons", *IBM Technical Disclosure Bulletin*, vol. 38 No. 02, 1, (Feb. 1995).

Rush, N., et al., In: "After Dark" for Windows, User's Manual, Berkeley Systems, Inc., 8–9, (1991).

* cited by examiner

*Primary Examiner*—Cao (Kevin) Nguyen
(74) *Attorney, Agent, or Firm*—Ross Hunt, Jr.; Stites & Harbison PLLC

(57) ABSTRACT

Mutatably transparent controls are disclosed. In one embodiment of the invention, a system includes an operating environment, and at least one computer program. The operating environment has a graphical user interface. Each computer program has at least one display displayable within the graphical user interface. The system is configured so that the opacity of the at least one display changes in response to a particular event. Desirably, each display comprises a control.

53 Claims, 6 Drawing Sheets

MUTATABLY TRANSPARENT DISPLAYS

RELATED APPLICATIONS

This application a continuation of U.S. Ser. No. 09/209,017, filed Dec. 10, 1998, now U.S. Pat. No. 6,222,531, which is a continuation of U.S. Ser. No. 09/002,986, filed Jan. 5, 1998 (U.S. Pat. No. 5,933,141).

This application relates to the co-pending, co-filed, and co-assigned applications entitled "System for using a channel and event overlay for invoking channel and event related functions," "Multipurpose channel banner," "Displaying layered information using lenticular-like interfaces," and "Controlling the layout of graphics in a television environment," all of which are hereby incorporated by reference.

FIELD OF THE INVENTION

This invention relates generally to displays such as displayable controls for computer programs, and more specifically to such displays that are mutatably transparent.

BACKGROUND OF THE INVENTION

Graphical user interfaces have become increasingly standard as part of operating environments for computers such as personal computers (PC's), as well as for computers running within audio-visual equipment such as televisions (TV's) and video cassette recorders (VCR's). For example, the graphical user interface provided by versions of the Microsoft Windows operating system includes a user-controllable pointer. The user is able to control the pointer through the use of a pointing device, such as a mouse or touch pad, to, among other things, access controls displayed within the graphical user interface on a display device of the computer. These controls are associated with computer programs running on the computer (i.e., the operating system itself, application programs, etc.).

However, because of the increasing number of programs being required to run on a computer concurrently, more and more controls are required to be displayed within the graphical user interface on the display device at the same time, placing a premium on the area of the display device dedicated for this purpose. For example, whereas at one time only one or two programs may have run on a computer concurrently—such as a word processor running within an operating system—now many such computer programs are being run. This is especially true in convergence systems, where besides application programs such as word processors, spreadsheets, etc., computer programs mimicking real world devices, such as television tuner programs, telephony programs, etc., are also being run. Thus, a display device must increasingly display large amounts of information, particularly controls associated with all of these programs.

Ultimately, this has resulted in the graphical user interfaces displayed on such display devices to become cluttered with the controls of the computer programs running on the computer. Some or all of the controls of each computer program may be running on the computer at the same time, such that the user of the computer may encounter difficulty in deciphering the controls, and therefore in using the computer as well. The controls of one computer program may interfere with those of another computer program. There is a need, therefore, for better management of on-screen controls of computer programs within a graphical user interface provided by the operating environment of a computer. Better management of the on-screen controls should make it easier for the user to decipher the controls, such that using the computer becomes easier as well.

SUMMARY OF THE INVENTION

The above-identified shortcomings as well as other shortcomings and problems are addressed by the present invention, which will be understood by reading and studying the following specification. In one embodiment of the invention, a system includes an operating environment, and at least one computer program. The operating environment has a graphical user interface. Each computer program has at least one display displayable within the graphical user interface. The system is configured so that the opacity of the at least one display changes in response to a particular event. Desirably, each display comprises a control; however, the invention is not so limited, as those of ordinary skill within the art can appreciate.

Thus, for example, a plurality of controls for a computer program in accordance with the invention may include three controls, only any one of which may be accessed by the user at a given time. In a first configuration, all of these three controls are opaque, meaning that all of them are displayed within the graphical user interface on the display device. However, in a second configuration, only one of the controls is opaque, and the remainder are transparent; that is, only one is displayed. The particular event causing the controls to switch between these configurations is the movement of a user-controllable pointer within the graphical user interface from a position not over one of the controls, to a position over one of the controls. Thus, when the user moves the pointer over one of the controls, the other two controls are not displayed.

This provides for better management of on-screen controls. In the example just described, a user may desire to alter the display characteristics of a video source displayed on the display device, and upon which the graphical user interface is overlaid. Calling up all the controls for these display characteristics (brightness, color, tint, etc.) may interfere with the display of the video source itself, making it difficult for the user to see the effects of changing any one characteristic. However, as provided in the example just described, in the second configuration, only one of the controls is displayed. Thus, the user is able to first call up all the controls to determine which should be affected (in the first configuration), and then is able to render all but the desired control transparent to more easily see the immediate effects of changing the desired control (in the second configuration).

Therefore, switching a plurality of controls of a computer program between a first configuration in which at least one of the controls is opaque, and a second configuration in which at least one of the controls is at least semi-transparent, provides for better management of on-screen controls. In different embodiments of the invention, computers, computerized systems, computer programs, and computer-readable media of varying scope are described. Still other and further embodiments, aspects and advantages of the invention will become apparent by reference to the drawings and by reading the following detailed description.

DETAILED DESCRIPTION OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the appended claims. For example, the following detailed description specifically describes controls of computer programs. However, this is exemplary only; the invention itself includes any and all electronically generated displays of information (such as those generated by set-top boxes, hand-held personal digital assistants, cellular telephones, etc.), of which controls are only one example.

Figure 1:
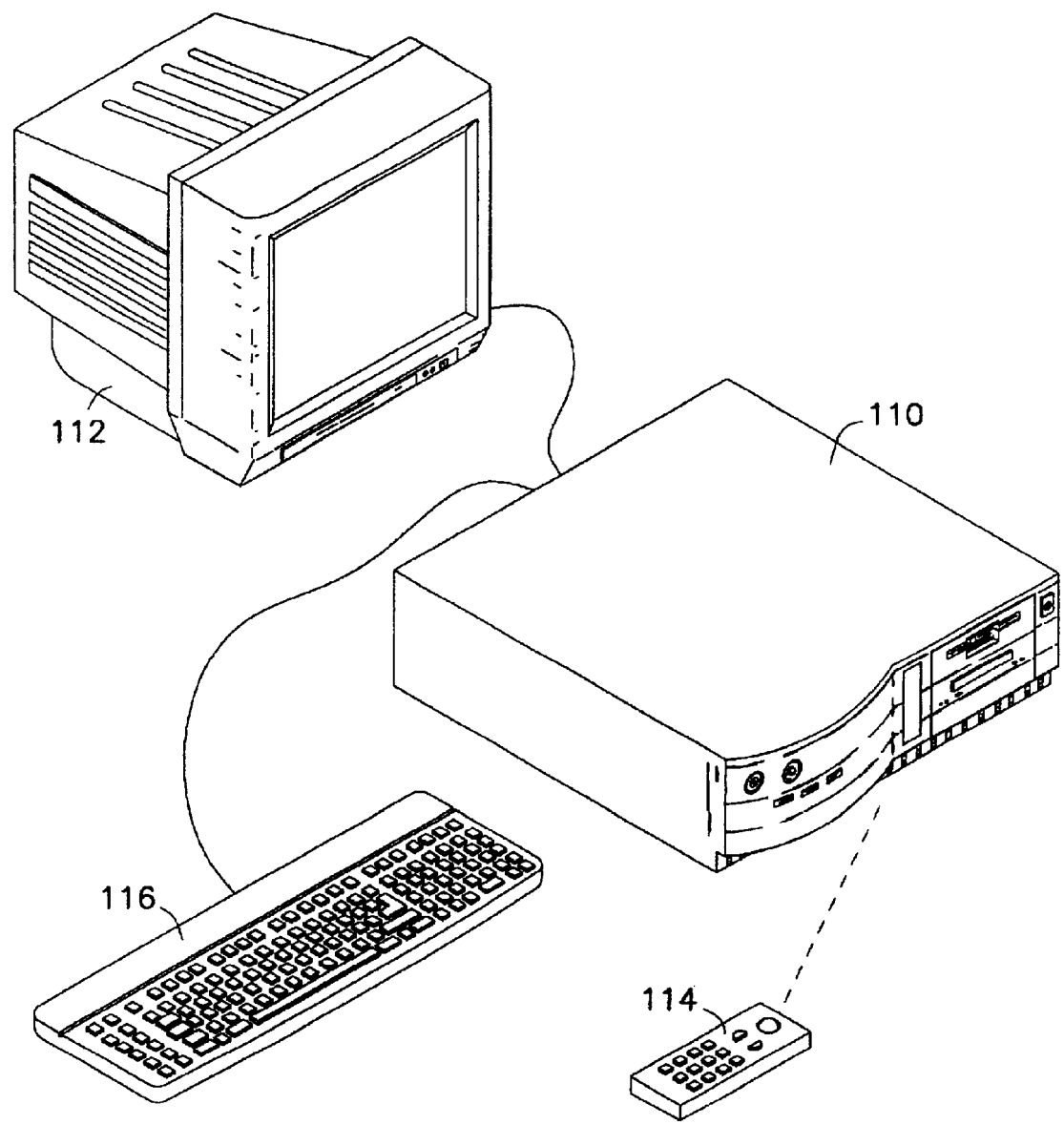
FIG. 1 is a diagram of a computerized system in conjunction with which embodiments of the invention may be implemented.

Referring first to FIG. 1, a diagram of a computerized system in conjunction with which embodiments of the invention may be implemented is shown. Computer 110 is operatively coupled to monitor 112, pointing device 114, and keyboard 116. Computer 110 includes a processor (preferably, an Intel Pentium processor), random-access memory (RAM) (preferably, at least thirty-two megabytes), read-only memory (ROM), and one or more storage devices, such as a hard disk drive, a floppy disk drive (into which a floppy disk can be inserted), an optical disk drive, and a tape cartridge drive. The memory, hard drives, floppy disks, etc., are types of computer-readable media. The invention is not particularly limited to any type of computer 110. Computer 110 preferably is a PC-compatible computer. The construction and operation of such computers are well known within the art.

Computer 110 desirably includes integrated therein or coupled thereto hardware to provide for what is known as the art as a "convergence environment" such that computer 110 provides capability beyond ordinary PC operation. Such capability preferably includes TV capability. For example, the Gateway Destination PC/TV system, available from Gateway 2000, Inc., provides a convergence environment across two primary modes of operation: TV viewing, and PC operation. Computer 110 desirably provides for integration with or includes audio/visual (i.e., multimedia) devices including but not limited to: a sound card, a digital video disc (DVD) player, a direct broadcast satellite (DBS) receiver, a TV tuner (for broadcast and/or cable TV), audio/visual inputs for external or auxiliary devices, a CD-ROM player, an audio/visual tuner having at least radio tuning capability, a cable decoder, a video cassette recorder, a laser disc player, a compact disc player, a set-top box, a cable box, a DBS integrated receiver-decoder (IRD), and a video camera.

Computer 110 also has at least one operating environment running thereon, each desirably providing a graphical user interface including a user-controllable pointer. Such operating environments include operating systems such as versions of the Microsoft Windows operating systems known in the art. The invention is not limited to any particular operating environment, however, and the construction and use of such operating environments are well known within the art. In one embodiment, the operating environment is part of or integrated with the software architecture described in the co-pending and co-filed case entitled "Architecture for Convergence Systems," which is hereby incorporated by reference. Those of ordinary skill within the art will appreciate that the invention does not require a relatively high-performance computer for implementation; for example, a DSS set-top box having only 512 K of random-access memory (RAM) is sufficient for implementation of the invention.

Furthermore, computer 10 may be communicatively connected to the Internet, any particular manner by which the invention is not limited to, and which is not shown in FIG. 1. Internet connectivity is well known within the art. In one embodiment, the computer includes a modem and corresponding communication drivers to connect to the Internet via what is known in the art as a "dial-up connection." In another embodiment, the computer includes an Ethernet or similar hardware card to connect to a local-area network (LAN) that itself is connected to the Internet via what is known in the art as a "direct connection" (e.g., T1 line, etc.).

Monitor 112 permits the display of information, including computer, video and other information, for viewing by a user of the computer. The invention is not limited to any particular monitor 112, and monitor 112 is one type of display device that may be used by the invention. Such monitors include cathode ray tube (CRT) displays, as well as flat panel displays such as liquid crystal displays (LCD's). The monitor is, however, desirably a 31" VGA monitor. Pointing device 114 permits the control of the screen pointer provided by the graphical user interface of operating systems such as versions of Microsoft Windows. The invention is not limited to any particular pointing device 114. Such pointing devices include mouses, touch pads, trackballs, remote controls and point sticks. Finally, keyboard 116 permits entry of textual information into computer 110, as known-within the art, and the-invention is not limited to any particular type of keyboard. Desirably, keyboard 116 is a wireless keyboard.

Figure 2:
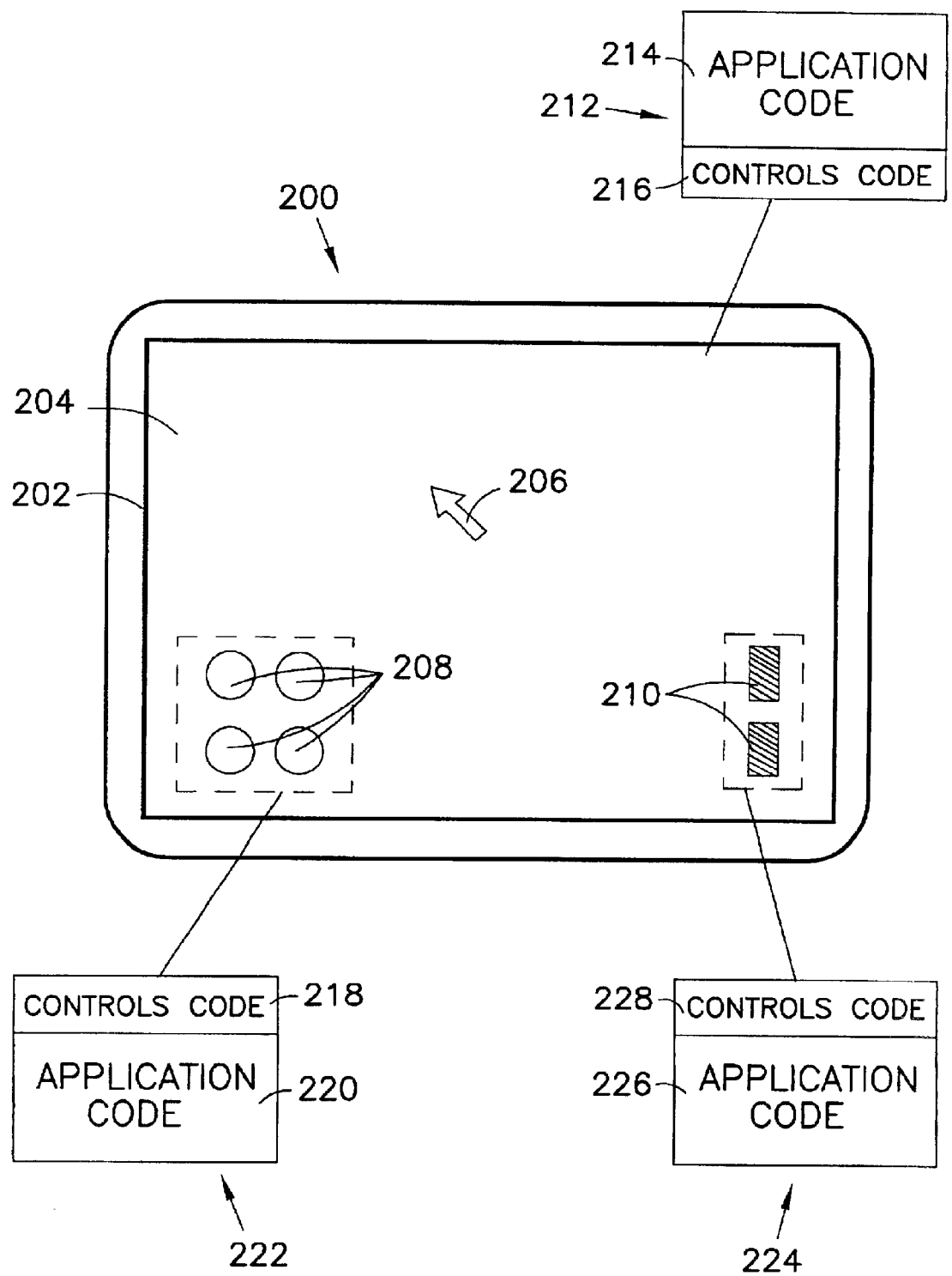
FIG. 2 is a block diagram showing the relationship between a operating environment having a graphical user interface and application programs having controls displayable within the graphical user interface.

Referring now to FIG. 2, a block diagram illustrating the relationship between a graphical-user-interface operating environment and other computer programs having controls displayable within the graphical user interface, is shown. The block diagram is a conceptual view of one embodiment of the invention, to aid in description of the invention. Those of ordinary skill within the art will recognize that concrete embodiments of the invention are readily adapted from this conceptual view of one embodiment of the invention. Furthermore, as will be described in conjunction with FIGS. 3(a)–3(d), 4(a)–4(c), 5(a)–5(b) and 6(a)–6(b), several such exemplary embodiments are provided herein.

Display device 200 of FIG. 2 includes screen 202 upon which graphical user interface 204 is displayed. Graphical user interface 204 includes user-controllable pointer 206, which is controlled by the user via a pointing device such as a mouse or touch pad of a computer such as that which has been described in conjunction with FIG. 1. As shown in FIG. 2, for illustrative purposes controls 208 and 210 are displayed within graphical user interface 204. Graphical user interface 204 is provided by operating system 212 having application code 214 and controls code 216; controls 208 are provided by application program 222 having application code 220 and controls code 218; and, controls 210 are provided by application program 224 having application code 226 and controls code 228.

Operating system 212 and application programs 222 and 224 are computer programs (software) residing within or upon a computer-readable medium (such as a memory or a floppy disk) and comprising computer-executable instructions (i.e., executable by a processor of a computer) running on a computer such as that which has been described in conjunction with FIG. 1. Operating system 212 is an operating environment, and may be any type of environment running a computer that provides a graphical user interface. Commonly available graphical-user-interface operating environments include versions of Microsoft Windows, as has been described.

Each of the computer programs, including the operating system, includes application code and controls code. The application code is the code that provides for the functionality of an associated computer program. The invention is not limited to any particular functionality. In one embodiment, at least one of the computer programs has particular functionality comprising a virtual appliance mimicking a device external to the computer on which the computer program is running (such as a telephone, or a television). The controls code is the code that provides for a plurality of controls for use with the functionality and displayable within the graphical user interface, per the embodiment of the invention as described herein.

In the case of operating system 212, application code 214 provides for the functionality of the operating system, such as the manner by which input/output (I/O) devices (printers, monitors, etc.) are accessed within and by the computer, etc. Controls code 216 provides for graphical user interface 204 itself, including user-controllable pointer 206. In case of application program 222, application code 220 provides for a particular functionality, while controls code 218 provides for controls 208 displayable within graphical user interface 204. Similarly, in the case of application program 224, application code 226 provides for a particular functionality, while controls code 226 provides for controls 210 displayable within graphical user interface 204.

In one embodiment of the invention, the plurality of controls for a given computer program (such as controls 208 of program 222, or controls 210 of program 224) has a first configuration in which at least one of the controls is opaque, and a second configuration in which at least one of the controls is at least semi-transparent. The occurrence of a particular event switches the plurality of controls between the first and the second configurations. Thus, for program 222, in a first configuration at least one of the controls 208 is opaque, and in a second configuration, at least one of the controls 208 is at least semi-transparent.

The invention is not limited to any particular event governing the switching between the two configurations. One such particular event comprises particular positioning of the user-controllable pointer 206 within the graphical user interface relative to at least one of the controls. For example, in a first configuration all of controls 208 may be opaque, whereas in a second configuration, only one of controls 208 may be opaque (i.e., the remainder being at least semi-transparent). The switching between these two configurations may be governed by movement of pointer 206 from a position not over any of controls 208 (first configuration) to a position over one of the controls, such that only that control is opaque (second configuration).

Another particular event comprises selection of a particular control in conjunction with the user-controllable pointer within the graphical user interface. Thus, as applied to the example just described, rather than the second configuration being triggered by the positioning of pointer 206 over one of controls 208, the second configuration is triggered by the occurrence of the event of selection of one of controls 208. Selection of one of controls 208 may encompass positioning of pointer 206 over the controls, and then clicking on a mouse button of the pointing device of the computer.

Figure 3A:
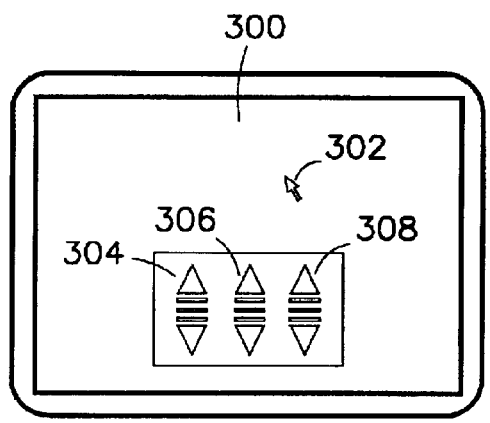
FIGS. 3(a)–3(d) are diagrams showing operation of controls of a computer program displayable within a graphical user interface, according to one embodiment of the invention.

Exemplary operation of controls of a computer program is illustrated by reference to FIGS. 3(a)–3(d), 4(a)–4(c), 5(a)–5(b) and 6(a)–6(b). FIGS. 3(a)–3(d) a diagrams showing operation of controls of a computer program displayable within a graphical user interface, according to one embodiment of the invention. Referring first to FIG. 3(a), within graphical user interface 300, user-controllable pointer 302 is shown as not positioned over any of controls 304, 306 and 308. Controls 304, 306 and 308 may represent a picture adjustment control overlay that has been called up by the user. Controls 304, 306 and 308 are fully opaque (minimum transparency), and thus clearly visible. FIG. 3(a) represents a first configuration of these controls.

Figure 3B:
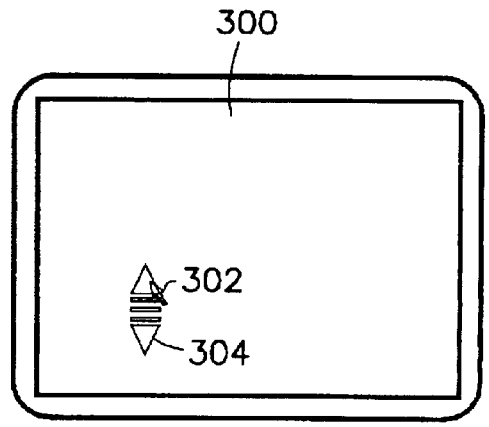

Referring next to FIG. 3(b), user-controllable pointer 302 has been positioned over control 304, such that only control 304 remains opaque (visible); controls 306 and 308 have become completely transparent (invisible). FIG. 3(b) represents a second configuration of these controls. Thus, the particular event governing switching between the first and the second configurations of controls 304, 306 And 308 comprises particular positioning of the pointer within graphical user interface 300 relative to at least one of the controls (here, control 304).

Figure 3C:
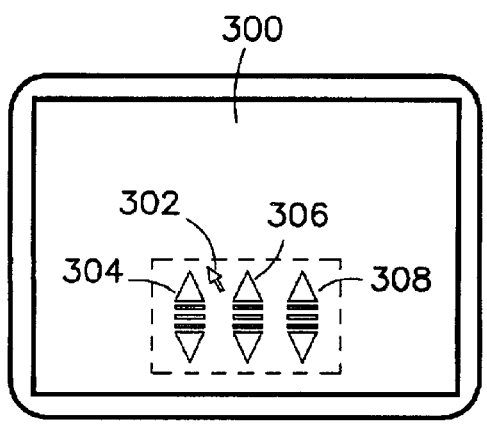
Figure 3D:
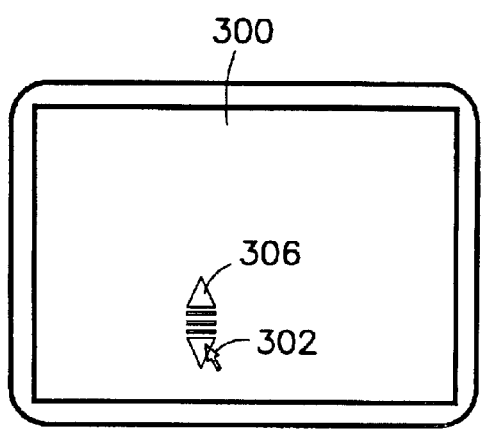

Referring next to FIG. 3(c), pointer 302 has been re-positioned such that it is no longer over control 304. Thus, controls 304, 306 and 308 return to their first configuration where they all are visible (opaque). Referring finally to FIG. 3(d), pointer 302 has now been positioned over control 306, such that only control 306 is opaque (visible); controls 304 and 308 have become completely transparent (invisible). FIG. 3(d) thus represents another second configuration of these controls. The concept of only the control over which the pointer is positioned being shown may also be referred to as "opaque-on-demand" overlays.

Figure 4A:
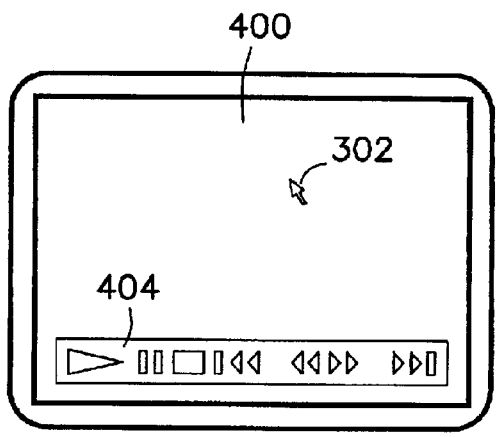
FIGS. 4(a)–4(c) are diagrams showing operation of controls of a computer program displayable within a graphical user interface, according to another embodiment of the invention.
Figure 4B:
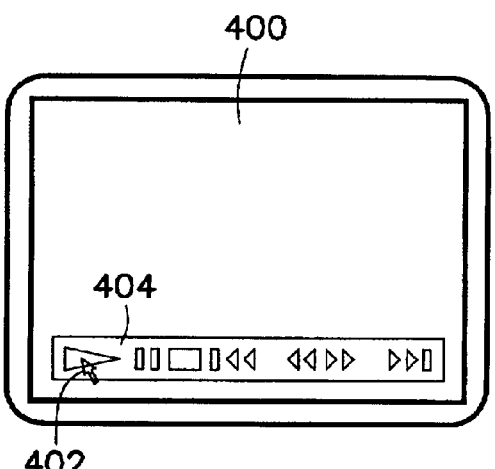
Figure 4C:
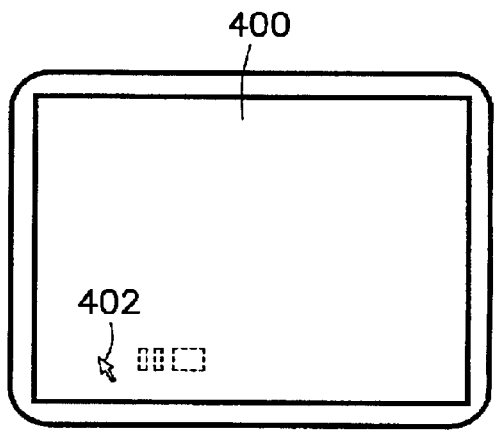

In FIGS. 4(a)–4(c), diagrams showing operation of controls of a computer program displayable within a graphical user interface, according to another embodiment of the invention, are shown. Referring first to FIG. 4(a), within graphical user interface 400, user-controllable pointer 302 is shown as not positioned over any of the controls of control bar 404. Control bar 404 may represent the controls of a video cassette recorder (VCR) or digital video disc (DVD) player. Control bar 404 is fully opaque (minimum transparency), and thus clearly visible. FIG. 4(a) represents a first configuration of these controls.

Referring next to FIG. 4(b), user-controllable pointer 402 has been positioned over the play control of control bar 404.

Once the user selects this control—for example, by pressing an appropriate mouse button of the pointing device used to move pointer 402—control bar 404 proceeds to a second configuration shown in FIG. 4(c). Referring to FIG. 4(c), all of the controls within control bar 404 have become transparent, except for the two controls representing functions the user most likely needs to get to—the pause control and the stop control. These controls are shown as semi-transparent.

Semi-transparency may be accomplished in any number of ways: in one embodiment, dithering is used to accomplish semi-transparency; in another embodiment, the inside of the control are totally transparent, and only the edges thereof are visible (giving an appearance of molded glass). The invention is not so limited. Other embodiments utilize alpha-blending, whereby images from two different graphics planes are fused into a single image by averaging or another algorithm, whether accomplished by hardware or software. Still other embodiments utilize combinations of the above-mentioned techniques, for instance, where the interior is left entirely transparent, while dithering or alpha-blending is performed on the outer edge, to give the control the look of molded glass. Thus, those of ordinary skill in the art will appreciate that semi-transparency may be accomplished by any manner. The particular event governing switching between the first and second configurations of control bar 404 comprises selection of a particular control in conjunction with the user-controllable pointer within the graphical user interface.

Figure 5A:
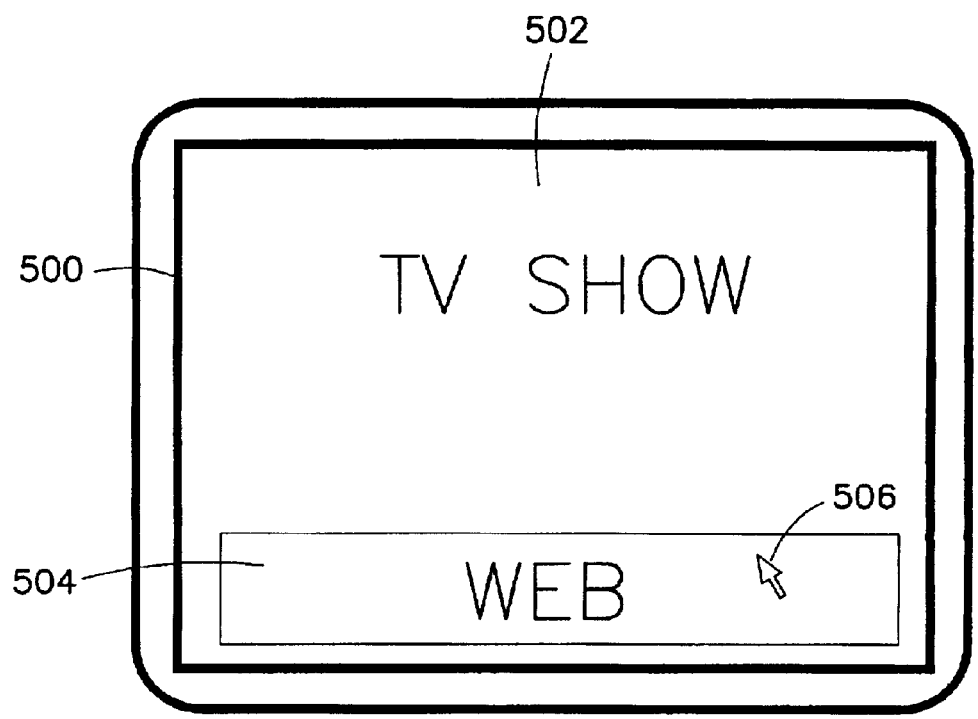
FIGS. 5(a)–5(b) are diagrams showing operation of controls of a computer program displayable within a graphical user interface, according to still another embodiment of the invention; and, FIGS. 6(a)–6(b) are diagrams showing operation of controls of a computer program displayable within a graphical user interface, according to still yet another embodiment of the invention.
Figure 5B:
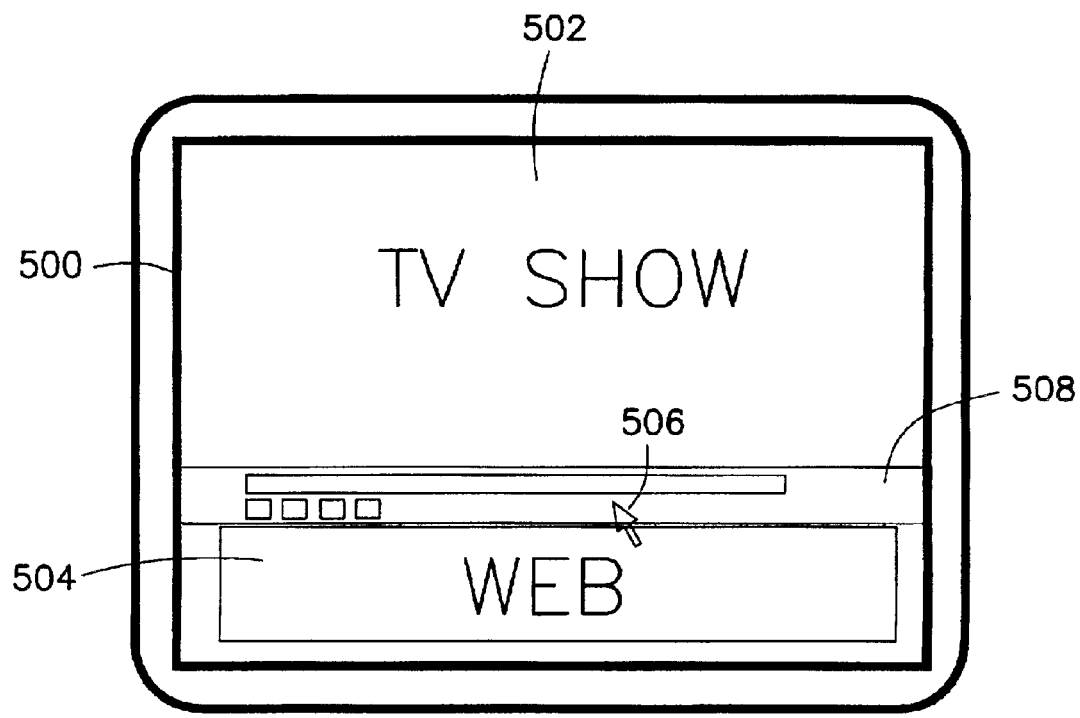

In FIGS. 5(a)–5(b), diagrams showing operation of controls of a computer program displayable within a graphical user interface, according to still another embodiment of the invention, are shown. Referring first to FIG. 5(a), graphical user interface 500, in which web browser application program 504 is running, is superimposed (i.e., overlaid) on top of television source 502. Such web browser application programs are known within the art. User-controllable pointer 506 is shown as not positioned over any part of television source 502 (i.e., and is instead within web browser program 504). Referring next to FIG. 5(b), when pointer 506 is positioned over a lower portion of television source 502, control panel 508 for web browser program 504 appears superimposed on source 502.

Thus, FIG. 5(b) represents a first configuration for the controls of control panel 508, while FIG. 5(a) represents a second configuration for the controls of control panel 508. In the first configuration, pointer 506 is positioned over panel 508, such that all of the controls within the panel are opaque (visible). Moving pointer 506 to a position back over web browser program 504 causes all the controls within the panel to become transparent (invisible). The particular event triggering switching between the first and the second configurations comprises, therefore, particular positioning of the pointer within the graphical user interface relative to the controls of the control panel.

In an alternative embodiment, not shown in FIG. 5(a) or FIG. 5(b), another control panel may be positioned within television source 502 immediately above control panel 508. Such a control panel may be completely viewable (i.e., become completely opaque) only when pointer 506 is moved to a position above control panel 508. However, such a control panel may be partially viewable (i.e., semi-transparent or semi-opaque) when pointer 506 is moved to a position over control panel 508. In such instance, the controls of this control panel, as well as control panel 508, are referred to as progressively transparent. That is, their transparency progresses as the pointer is moved towards and over them, or away from them.

Figure 6A:
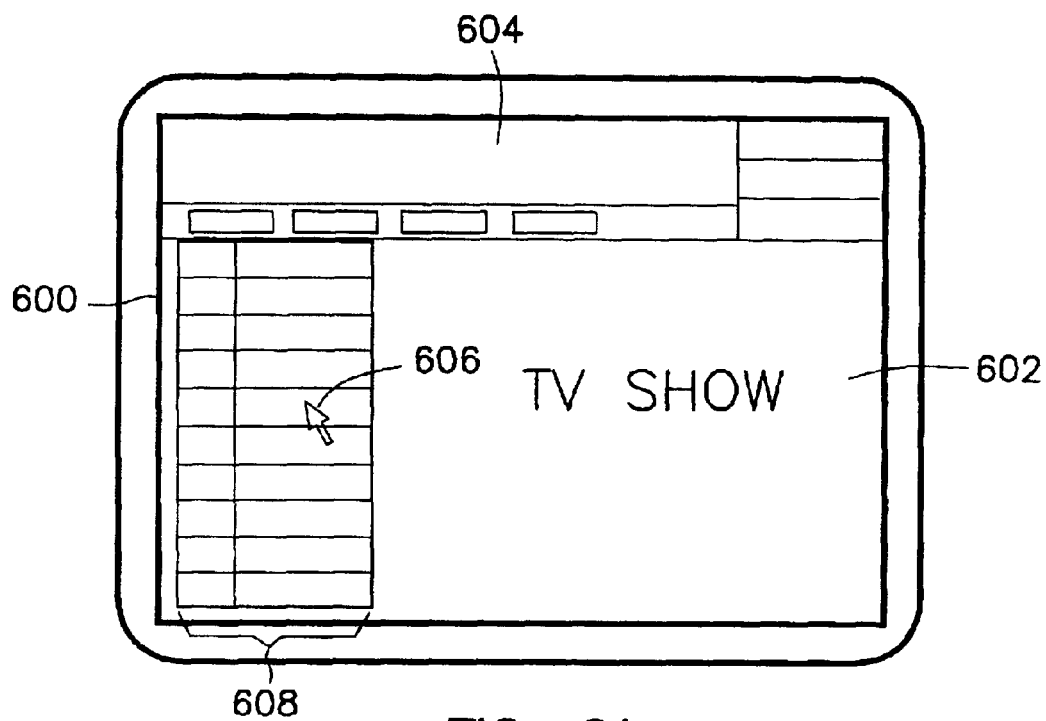
Figure 6B:
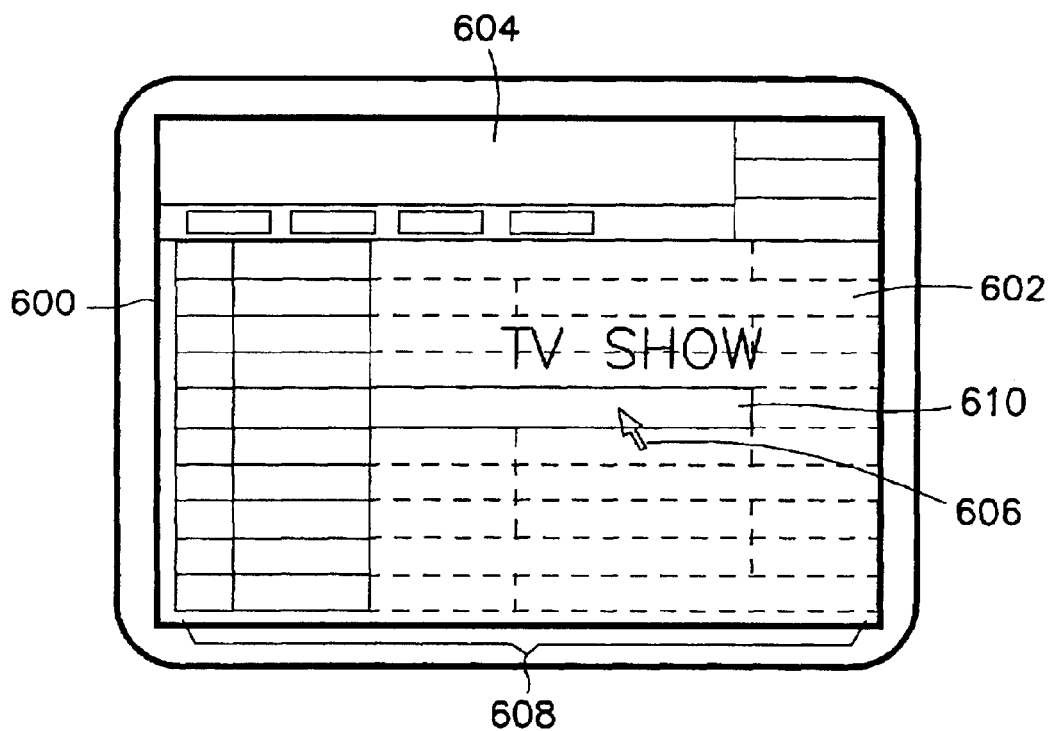

In FIGS. 6(a)–6(b), diagrams showing operation of controls of a computer program displayable within a graphical user interface, according to still yet another embodiment of the invention, are shown. Referring first to FIG. 6(a), graphical user interface 600, in which electronic program guide (EPG) application program 604 is running, is superimposed (i.e., overlaid) on top of television source 602. Such EPG application programs are known within the art. User-controllable pointer 606 is shown as positioned over completely opaque EPG entries (which the definition of controls encompasses for purposes of this patent application) 608. Referring next to FIG. 6(b), when pointer 606 is positioned over television source 602, more EPG entries 608 are displayed—in addition to the completely opaque controls of FIG. 6(a), semi-transparent controls are also displayed. These controls are semi-transparent so that television source 602 is still visible to the user. Furthermore, as represented by element 610, although the grid area that is displayed over the television source 602 is semi-transparent, the particular information cell in that portion of the grid over which the pointer is placed is opaque.

Thus, FIG. 6(a) represents a first configuration for the control of EPG entries 608, while FIG. 6(b) represents a second configuration for the controls of EPG entries 608. In the first configuration, pointer 606 is positioned over the opaque EPG entries, such that only these entries are visible. Moving pointer 606 to a position not over these entries, and instead over television source 602, causes the remaining entries to become visible (semi-transparent). The particular event triggering switching between the first and the second configuration comprises, therefore, particular position of the pointer within the graphical user interface relative to the controls (EPG entries). The embodiment of FIG. 6(a) and FIG. 6(b) permits the user to view more EPG entries, while still viewing the television source.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

I claim:

1. A computer-readable medium for a computer having an executable program stored thereon comprising:

means for causing the computer to perform a particular functionality; and, means for providing a plurality of controls for use with the particular functionality and displayable within a graphical user interface, the plurality of controls having a first configuration in which at least one of the controls is opaque, and a second configuration in which at least one of the control are at least semi-transparent, such that occurrence of a particular event switches the plurality of controls between the first and the second configurations.

2. The computerized system of claim 1, wherein the particular event includes positioning of the user-controllable pointer within the graphical user interface relative to the at least one display.

3. The computerized system of claim 1, wherein the particular event comprises selection of a particular display in conjunction with a user-controllable pointer within the graphical user interface.

4. The computerized system of claim 1, further comprising:
- a processor; and,
- a computer-readable medium,
  wherein the at least one computer program is executed from the computer-readable medium by the processor, and the operating environment is provided from the computer-readable medium by the processor.

5. The computer of claim 4, wherein the computer-readable medium comprises a memory.

6. The computer-readable medium of claim 1, wherein the particular event comprises particular positioning of a user-controllable pointer within the graphical user interface relative to at least one of the controls.

7. The computer-readable medium of claim 1, wherein the particular event comprises selection of a particular control in conjunction with a user-controllable pointer within the graphical user interface.

8. The computer-readable medium of claim 1, wherein the medium is a floppy disk.

9. A computerized system comprising:
- an operating environment having a graphical user interface including a user-controllable pointer;
- at least one computer program, each computer program having a plurality of controls displayable within the graphical user interface, the plurality of controls having a first configuration in which at least one of the controls is opaque, and a second configuration in which at least one of the controls are at least semi-transparent,
- such that occurrence of a particular event switches the plurality of controls between the first and the second configurations.

10. The computerized system of claim 9, wherein the particular event comprises particular positioning of the user-controllable pointer within the graphical user interface relative to at least one of the controls.

11. The computerized system of claim 9, wherein the particular event comprises selection of a particular control in conjunction with the user-controllable pointer within the graphical user interface.

12. The computerized system of claim 9, wherein all of the controls are opaque within the first configuration of the plurality of the controls.

13. The computerized system of claim 9, wherein the at least one of the controls within the second configuration of the plurality of the controls are completely transparent.

14. A computer comprising:
- a processor;
- a computer-readable medium;
- an operating environment having a graphical user interface including a user-controllable pointer, the environment provided from the computer-readable medium by the processor; and,
- at least one computer program, each computer program executed from the computer readable medium by the processor and having a plurality of controls displayable within the graphical user interface, the plurality of controls having a first configuration in which at least one of the controls is opaque, and a second configuration in which at least one of the controls are at least semi-transparent,
- such that occurrence of a particular event switches the plurality of controls between the first and the second configurations.

15. The computer of claim 14, wherein the particular event comprises particular positioning of the user-controllable pointer within the graphical user interface relative to at least one of the controls.

16. The computer of claim 14, wherein the particular event comprises selection of a particular control in conjunction with the user-controllable pointer within the graphical user interface.

17. The computer of claim 14, wherein the computer-readable medium comprises a memory.

18. A computer program comprising:
- application code to cause a computer on which the program is running to perform a particular functionality;
- controls code to provide a plurality of controls for use with the particular functionality and displayable within a graphical user interface, the plurality of controls having a first configuration in which at least one of the controls is opaque, and a second configuration in which at least one of the controls are at least semi-transparent,
- such that occurrence of a particular event switches the plurality of controls between the first and the second configurations.

19. The computer program of claim 18, wherein the particular event comprises particular positioning of a user-controllable pointer within the graphical user interface relative to at least one of the controls.

20. The computer program of claim 18, wherein the particular event comprises selection of a particular control in conjunction with a user-controllable pointer within the graphical user interface.

21. The computer program of claim 18, wherein the particular functionality of the application code comprises a virtual appliance mimicking a device external to the computer on which the computer program is running.

22. A computerized control management system, comprising:
- a computer coupled to a graphic display and having a user-controllable pointer;
- an application program operating on the computer; and
- a control element displayable on the display, wherein the application program is responsive to the control element, and further wherein the control element has two or more sets of display characteristics, wherein a first set of display characteristics is substantially opaque and a second set of display characteristics is substantially non-opaque and wherein the set of display characteristics displayed is a function of the distance between the control and the pointer.

23. The computerized system of claim 22, wherein the application program is responsive to a plurality of controls wherein each control is a member of at least one group of controls and all controls in a group are operative at a predetermined point in the execution of the program and are displayed using a first set of display characteristics.

24. The computerized system of claim 22, wherein the control element is displayed in a graphical user interface.

25. The computerized system of claim 22, wherein the pointer is user-controllable in a graphical user interface.

26. A computerized control management system, comprising:
- a computer coupled to a display and having a user-controllable pointer; an application program executable on the computer;
- a control element on the display, wherein the control element is defined by boundaries,
- wherein the application program is responsive to the control element, and further wherein the control element has two or more sets of display characteristics, wherein a first set of display characteristics is substantially opaque and a second set of display characteristics is substantially non-opaque and wherein the set of display characteristics changes when the pointer is within the boundaries of the control.

27. The computerized control management system of claim 26, having at least two groups of controls, wherein the group of controls that are operative are a function of the state of execution of the application program.

28. The computerized control management system of claim 27, wherein the controls in a group of controls have two or more sets of display characteristics, wherein the set of display characteristics for the controls in a group are a function of the distance between the pointer and a control in the group.

29. The computerized control management system of claim 26, wherein a first set of display characteristics is substantially a first color and a second set of display characteristics is substantially a second color.

30. The computerized control management system of claim 26, wherein a first set of display characteristics includes a contrasting boundary and the interior of the boundary is non-opaque.

31. A method of managing controls wherein the controls affect the operation of an executable application program on a computer wherein the computer has a display, a graphical user input environment and a user-controlled pointer, the method comprising:

displaying a user-controlled pointer on the computer display;

executing an application program having at least one control wherein the application program is responsive to the control and wherein the control has a boundary and an interior and at least two sets of selectable display characteristics; and displaying a selected set of display characteristics for the control wherein the selected set of display characteristics is a function of the position of the pointer relative to the position of the control.

32. The method of claim 31, wherein the application program has two or more groups of controls and further wherein displaying a selected set of display characteristics for the control includes displaying a selected set of display characteristics for a group of controls.

33. The method of claim 31, further including selecting a first set of display characteristics if the pointer is within the boundaries of a selected control and selecting a second set of display characteristics if the pointer is not within the boundaries of a selected control.

34. A computer system, comprising:

a computer;

a display coupled to the computer and having a pointer wherein the position of the pointer is user-controllable;

one or more application programs operating on the computer and responsive to the pointer;

one or more groups of controls, wherein each group has one or more user-accessible control, wherein at least one application program is responsive to a user-accessible control, and the one or more groups of controls each has two or more display modes wherein each display mode is a set of display characteristics, and further wherein each control has a position and boundaries; and a control program, operating on the computer, for controlling the display mode of groups of controls.

35. The computer system of claim 34, wherein the control program controls the display mode of the one or more groups of controls as a function of the distance between the pointer and a control.

36. The computer system of claim 34, wherein the control program controls the display mode of the one or more groups of controls as a function of the state of an application program.

37. The computer system of claim 34, wherein the control program controls the display mode of the one or more groups of controls as a function of the occurrence of a predetermined event.

38. The computer system of claim 34, wherein the control program controls the display mode of the one or more groups of controls as a function of the position of the pointer relative to the position of a control.

39. The computer system of claim 34, wherein the control program changes the display mode of the one or more groups of controls when the position of the pointer is within the boundaries of a control.

40. The computer system of claim 34, wherein a display mode includes a set of display characteristics that are substantially opaque.

41. A method for controlling a computer, the computer having a display and operating at least one application program responsive to a user-controlled pointer and responsive to actuation of at least one control selected from at least one set of controls, wherein at least one control has at least two modes of display wherein each mode includes a set of display characteristics, and each control has boundaries and a position, the method comprising:

executing the application program;

displaying one or more sets of controls as a function of the application program;

comparing the position of the pointer with the position of at least one control;

determining the state of at least one application program; and selecting the mode of at least one set of controls.

42. The method of claim 41, wherein determining the state of at least one application program includes determining which controls are operative at the time of determination.

43. A computer system, comprising:

a graphical user interface having at least one control, the at least one control having at least one action and a variable opacity capable of changing in response to an event;

controls code to provide a plurality of control programs to display the graphical user interface, at least one of the plurality of control programs capable of displaying the at least one control and changing its opacity in response to the event;

application code to provide a plurality of application programs, at least one of the application programs capable of performing the at feast one action of the at least one control; and an operating environment to provide the application code and the controls code.

44. The computer system of claim 43 wherein the variable opacity is opaque.

45. The computer system of claim 43 wherein the variable opacity is transparent.

46. The computer system of claim 43 wherein the variable opacity is semi-transparent.

47. The computer system of claim 46 wherein the at least one of the plurality of control programs is capable of using dithering to display the semi-transparent variable opacity of the at least one control.

48. The computer system of claim 46 wherein the at least one of the plurality of control programs is capable of displaying only the edges of the at least one control to give an appearance of molded glass.

49. The computer system of claim 46 wherein the at least one of the plurality of control programs is capable of using alpha-blending to display the semi-transparent variable opacity of the at least one control.

50. The computer system of claim 43 wherein one of the plurality of application programs operates a video cassette recorder.

51. The computer system of claim 50 wherein one of the at least one control has a variable opacity of opaque and an action of play.

52. The computer system of claim 51 wherein the event is selecting the play action and one of the plurality of control programs changes the variable opacity of the at least one control from opaque to transparent.

53. The computer system of claim 52 wherein one of the at least one control has an action of pause and a variable opacity of semi-transparent and another of the at least one control has an action of stop and a variable opacity of semi-transparent.

* * * * *